United States Patent
Moughler

(10) Patent No.: US 7,301,445 B2
(45) Date of Patent: Nov. 27, 2007

(54) TIRE MAINTENANCE SYSTEM

(75) Inventor: Eric Alan Moughler, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 234 days.

(21) Appl. No.: 11/022,685

(22) Filed: Dec. 28, 2004

(65) Prior Publication Data

US 2006/0152352 A1 Jul. 13, 2006

(51) Int. Cl.
*B60C 23/00* (2006.01)

(52) U.S. Cl. .......... 340/442; 340/438; 73/146; 116/34 R

(58) Field of Classification Search ........ 340/438–448; 73/146–146.8; 116/34 A, 34 B, 34 R
See application file for complete search history.

(56) References Cited

U.S. PATENT DOCUMENTS

| | | | |
|---|---|---|---|
| 4,839,835 A * | 6/1989 | Hagenbuch | 702/174 |
| 5,522,144 A | 6/1996 | Smoorenburg | |
| 5,749,984 A * | 5/1998 | Frey et al. | 152/415 |
| 5,864,056 A * | 1/1999 | Bell et al. | 73/146 |
| 5,945,908 A * | 8/1999 | Nowicki et al. | 340/447 |
| 6,076,035 A * | 6/2000 | Yanase | 701/80 |
| 6,705,155 B2 | 3/2004 | Katou | |
| 6,759,952 B2 * | 7/2004 | Dunbridge et al. | 340/444 |
| 2001/0018628 A1 * | 8/2001 | Jenkins et al. | 701/35 |
| 2002/0092347 A1 | 7/2002 | Niekerk et al. | |
| 2002/0107873 A1 * | 8/2002 | Winkler et al. | 707/104.1 |
| 2004/0020420 A1 | 2/2004 | Evans et al. | |

* cited by examiner

*Primary Examiner*—Benjamin C. Lee
(74) *Attorney, Agent, or Firm*—Finnegan, Henderson, Farabow, Garrett & Dunner

(57) ABSTRACT

A method of managing at least one vehicle includes sensing a tire operating characteristic of the at least one vehicle, sensing a vehicle operating characteristic of the at least one vehicle, and providing an output. The output is indicative of an expected tire life, and is based on the tire operating characteristic and the vehicle operating characteristic of the at least one vehicle.

57 Claims, 2 Drawing Sheets

TIRE MAINTENANCE SYSTEM

TECHNICAL FIELD

The present disclosure relates generally to systems and methods of monitoring vehicles and, more particularly, to systems and methods of monitoring tire conditions of the vehicle.

BACKGROUND

Operating a conventional jobsite such as a construction site or mine may involve maintaining various fleets of different vehicles and/or work machines. The cost of preventive maintenance and general upkeep for such vehicle fleets can be a major expense depending on, for example, the size of the fleet and the type of vehicles in the fleet. Repairing and/or replacing vehicle tires may be one of the highest costs of maintaining such fleets. For example, in some mining jobsites, replacing the tires on a single vehicle may cost more than $150,000. Thus, in an effort to reduce jobsite operating and/or tire maintenance costs, jobsite managers may use methods of monitoring tire and vehicle condition. Some of these methods may involve the manual visual inspection of vehicle tires when the vehicle is stopped, such as, for example, during a shift change. During a shift change, a vehicle operator may inspect each tire of a particular vehicle and may record information corresponding to tire cuts, abnormalities, and/or other tire operating characteristics observed during the tire inspection. Alternatively, a tire may be fitted with a tire sensor configured to sense various tire operating characteristics.

For example, U.S. Pat. No. 6,705,155 ("the '155 patent") describes an apparatus and method for monitoring tire conditions. The method of the '155 patent includes measuring the temperature and pressure of each tire, and transmitting a signal from one of the tires representative of the above tire conditions. To provide for such monitoring, the '155 patent describes a transmitter device attached to each tire and configured to detect and transmit data representative of the temperature and pressure measurements.

Although the system of the '155 patent may detect aspects of tire condition, the system does not incorporate vehicle operating characteristic data in its evaluation of tire condition. Such a method may not enable a jobsite manager to accurately assess, for example, the causes of reduced tire life and may hinder the manager's ability to proactively improve jobsite conditions to prevent premature vehicle tire failure.

The system of the present disclosure is directed to overcoming one or more of the problems set forth above.

SUMMARY OF THE INVENTION

In one embodiment of the present disclosure, a method of managing at least one vehicle includes sensing a tire operating characteristic of the at least one vehicle, sensing a vehicle operating characteristic of the at least one vehicle, and providing an output. The output is indicative of an expected tire life, and is based on the tire operating characteristic and the vehicle operating characteristic of the at least one vehicle.

In another embodiment of the present disclosure, a method of managing a plurality of vehicles includes providing an output to an operator indicative of an expected tire life. The output is based on at least one sensed tire operating characteristic and at least one sensed vehicle operating characteristic of at least one of the plurality of vehicles. The method further includes altering the operation of the at least one of the plurality of vehicles in response to the expected tire life.

In still another embodiment of the present disclosure, a system for monitoring vehicle conditions of at least one vehicle includes a vehicle sensor configured to sense at least one vehicle operating characteristic of the at least one vehicle and a tire sensor configured to sense at least one tire operating characteristic of the at least one vehicle. The system also includes a controller in communication with each of the tire and vehicle sensors of the at least one vehicle. The system further includes a central processor in communication with the controller and configured to calculate an expected tire life of the at least one vehicle based on the at least one vehicle operating characteristic and the at least one tire operating characteristic.

In a further embodiment of the present disclosure, a method of managing a jobsite includes receiving information corresponding to an expected tire life of at least one of a plurality of vehicles based on a sensed tire operating characteristic and a sensed vehicle operating characteristic of the at least one vehicle. The method also includes altering a jobsite performance indicator in response to the expected tire life.

In another embodiment of the present disclosure, a method of managing a jobsite includes sensing a tire operating characteristic of at least one of a plurality of vehicles and sensing a vehicle operating characteristic of the at least one vehicle. The method further includes providing an output indicative of a jobsite condition based on the tire operating characteristic and the vehicle operating characteristic.

In still another embodiment of the present disclosure, a method of managing a jobsite includes sensing a tire operating characteristic of at least one of a plurality of vehicles and sensing a vehicle operating characteristic of the at least one vehicle. The method further includes providing an output indicative of an estimated jobsite productivity based on the tire operating characteristic and the vehicle operating characteristic.

DETAILED DESCRIPTION

Figure 1:
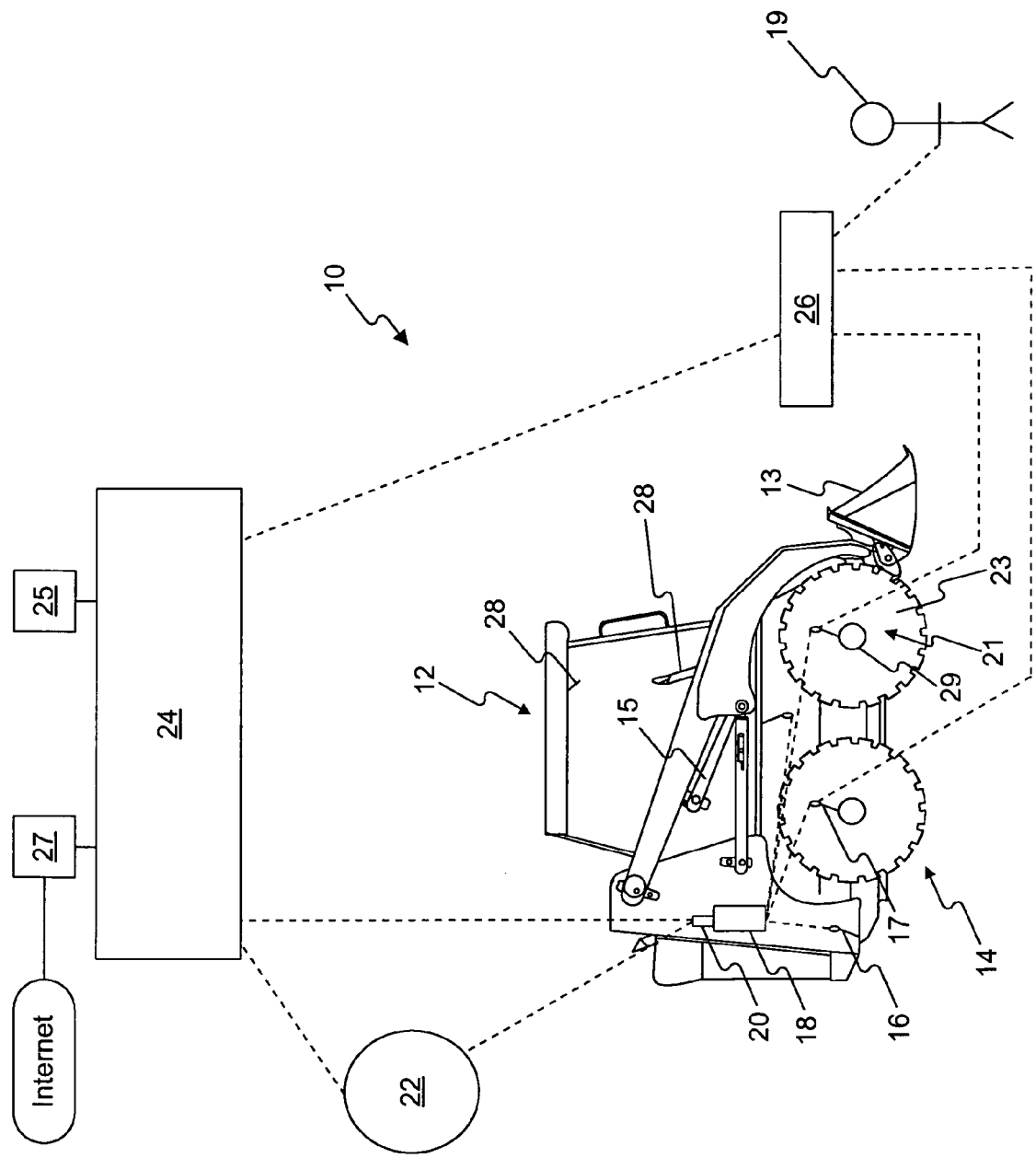
FIG. 1 is a partial schematic illustration of a monitoring system according to an exemplary embodiment of the present disclosure.

As shown in FIG. 1, a system 10 of the present disclosure may include a vehicle 12. The vehicle 12 may include at least one vehicle sensor 16 in communication with a controller 18. The vehicle 12 may also include at least one tire 14, and the tire 14 may include at least one tire sensor 17 in communication with the controller 18. The system 10 may further include a receiver 22 in communication with the vehicle 12. The receiver 22 may also be in communication with a central processor 24. It is understood that the controller 18 may include a transmitter 20 to facilitate communication between, for example, the controller 18 and the receiver 22 and/or the central processor 24.

The vehicle 12 of the present disclosure may be any type of vehicle known in the art, such as, for example, an on-road vehicle, an off-road vehicle, or a work machine. Although only one vehicle 12 is shown in FIG. 1, it is understood that the system 10 may include any number of vehicles 12. The multiple vehicles 12 may be of the same or different types and together, the vehicles 12 may form a fleet useful in performing a variety of conventional applications. The vehicles 12 of the present disclosure may be, for example, trucks, freight haulers, busses, mining vehicles, wheel dozers, wheel loaders, skid steer loaders, backhoe loaders, compactors, forest vehicles, front shovels, hydraulic excavators, integrated tool carriers, multiterrain loaders, material handlers, and agricultural tractors. Such vehicles 12 may be powered by, for example, a diesel, gasoline, turbine, lean-burn, or other combustion engine known in the art. The vehicles 12 may, thus, be any conventional vehicle having at least one tire 14. Such vehicles 12 may also include a variety of conventional work tools 13 useful in accomplishing a desired application.

Each of the vehicles 12 and/or work tools 13 described above may further include a variety of hydraulic, pneumatic, electric, and/or other components 15 useful in performing a desired application. For example, each vehicle 12 may include an engine, pumps, cooling fans, radiators, hydraulic cylinders, pneumatic cylinders, solenoids, motors, articulating members, and/or other components 15 configured to operate and/or power the vehicle 12, and/or actuate the work tool 13 connected to the vehicle 12. It is understood that each vehicle 12 and/or work tool 13 may further include other conventional components 15 not mentioned above to assist in performing the desired application.

Vehicle sensor 16 may include one or more sensors 16 connected to each of the components 15 and/or work tools 13 described above. The vehicle sensor 16 may be, for example, a temperature sensor, pressure sensor, position sensor, flow sensor, weight sensor, distance sensor, torque sensor, and/or other sensor capable of sensing machine operating characteristics. It is understood that as used herein, the term "operating characteristics" may include engine temperature, engine speed, engine torque, fluid temperature, fluid flow rate, fluid pressure, exhaust flow, exhaust temperature, run time, distance traveled, gear and/or throttle position, ambient air temperature, vehicle speed, cargo weight, brake temperature, brake application, fuel consumption, strut pressure, and/or other measurable properties known in the art. It is also understood that the fluids measured may be fuel, oil, hydraulic fluid, coolant, and/or any other working fluid known in the art.

In an exemplary embodiment of the present disclosure, a single vehicle sensor 16 may have multiple capabilities. For example, in addition to detecting engine temperature, the vehicle sensor 16 may also be capable of measuring engine speed. Alternatively, as mentioned above, each vehicle 12 may include a number of different vehicle sensors 16 configured to sense various operating characteristics of the vehicle 12. The vehicle sensors 16 may be located anywhere on the vehicle 12 depending on, for example, the size, shape, type, and function of the vehicle sensor 16. For example, in an embodiment in which a first vehicle sensor 16 is used to detect engine temperature and a second vehicle sensor 16 is used to detect hydraulic fluid pressure, the first vehicle sensor 16 may be connected to a housing of the engine (not shown) and the second vehicle sensor 16 may be connected to a hydraulic cylinder and/or other component 15 of the vehicle 12.

As mentioned above, the vehicle 12 may include a number of tires 14. The vehicle tires 14 may be any conventional tire capable of supporting the vehicle and a conventional load carried thereby. The tires 14 may include any conventional tire component known in the art. For example, the tires 14 may include treads or may be relatively bald depending on the application and/or type of vehicle on which the tire 14 is used. Each tire 14 may also include a carcass 21 having, for example, a side wall 23 extending radially from a tire hub 29.

As shown in FIG. 1, each tire 14 may further include a tire sensor 17. The tire sensor 17 may be embedded within, for example, the carcass of the tire 14 so as not to interfere with tire performance. Each tire sensor 17 may be configured to sense, for example, tire temperature, tire pressure, distance traveled, tire load, and/or any other tire operating characteristic or indicator of tire conditions. The tire sensor 17 may be, for example, a radio frequency identification type sensor or any other conventional sensor known in the art. Such tire sensors 17 may be capable of sensing tire operating characteristics during vehicle operation and/or while the vehicle 12 is shut down. The tire sensors 17 may also be configured to transmit sensed tire data through any conventional means, including, for example, radio waves, infrared signals, and/or conventional electric signals. Each tire sensor 17 may be configured to sense any number of the above tire operating characteristics or, alternatively, each tire 14 may include a number of different tire sensors configured to sense various operating characteristics of the tire 14.

The system 10 may further include a recorder 26 configured to receive data from, for example, the tire sensors 17 and/or an operator 19. The recorder 26 may be any conventional device capable of receiving, storing, and/or transmitting data, such as, for example, a hand-held scanner, a pocket PC, or other like device. The recorder 26 may be configured to scan and/or otherwise receive, for example, radio waves, infrared signals, and/or conventional electric signals emitted by the tire sensors 17. In addition, the recorder 26 may be capable of recording or otherwise storing data manually entered by the operator 19. The manually entered data may relate to the physical condition and/or other operating characteristics of the tires 14. As illustrated by the dotted lines in FIG. 1, the recorder 26 may be configured to send data received from the tire sensors 17 and/or the operator 19 to the central processor 24. In an additional exemplary embodiment, the recorder 26 may be a notepad, logbook, or other like notation means. In such an embodiment, the operator 19 may manually enter or otherwise transmit data from the recorder 26 into the central processor 24. It is understood that in a further exemplary embodiment, the vehicle 12 may include more than one controller 18.

Each vehicle sensor 16 and each tire sensor 17 may be in communication with the controller 18. The controller 18 may be, for example, an electronic control module, a processing unit, a laptop computer, or any other control device known in the art. The controller 18 may receive data and/or other input from a variety of sources in addition to the sensors 16, 17 mentioned above, such as, for example, the operator of the vehicle 12. In an exemplary embodiment, each vehicle 12 may further include a number of operator interfaces 28 in the operator's cabin through which the controller 18 may receive input from the operator. The controller 18 may be capable of storing the data received from the sensors 16, 17 and/or other sources mentioned above. The stored data may be uploaded and/or downloaded locally and/or remotely by any conventional means. The controller 18 may also be capable of processing the inputs using a number of preset algorithms and/or conventional statistical functions. The controller 18 may use the inputs to form a control signal based on the algorithms.

The control signal may be transmitted from the controller 18 to each of the components of the vehicle 12. The control signal may also contain alerts corresponding to sensed vehicle and/or tire operating characteristics. The controller 18 may be configured to store the alerts and/or transmit the alerts to, for example, the operator in the operator's cabin and/or the central processor 24. Thus, controller 18 may generally be configured to control the vehicle 12 and, more particularly, the controller 18 may be configured to control each of the components of the vehicle 12, to process data received from the sensors 16, 17 and/or other input sources, and to transmit data to the operator and/or the central processor 24.

As mentioned above, the controller 18 of each vehicle 12 may be in communication with the receiver 22. Communication between the controller 18 and the receiver 22 may be accomplished by any conventional means. In an exemplary embodiment of the present disclosure, the controller 18 may include a transmitter 20. The transmitter 20 may be configured to send and/or receive signals containing operating characteristic information. The transmitter 20 may utilize, for example, a radio, telephone, Internet, or other transmittal device capable of sending and/or receiving signals in a wireless and/or hard-wired format.

As illustrated by the dotted lines in FIG. 1, the receiver 22 may be configured to receive signals from the transmitter 20. The receiver 22 may also be configured to send data from the vehicle 12 to the central processor 24. The receiver 22 may be, for example, a satellite in an orbit around the earth. The receiver 22 may also be a conventional local area network configured to facilitate the exchange of data between the vehicle 12 and the central processor 24 in a conventional jobsite environment. Alternatively, in an embodiment in which the controller 18 and/or the transmitter 20 is configured to transmit information to the central processor 24 directly, the receiver 22 may be omitted.

The central processor 24 may be configured to receive signals from, for example, the receiver 22 and/or the vehicle 12 directly. The central processor 24 may be located locally relative to the vehicle 12. In such an embodiment, the central processor 24 may be located, for example, in a work trailer at the same mine and/or job site as the vehicle 12. Alternatively, the central processor 24 may be located remotely. For example, in an embodiment, the central processor 24 may be located in an operation headquarters located in a first state while the vehicle 12 is traveling throughout different parts of the first state and/or a second state. The central processor 24 may be any type of computer, workstation, processor, or other type of data processing device known in the art, and may be configured to process data corresponding to sensor output. In an exemplary embodiment of the present disclosure, a preset algorithm, statistical model, and/or other conventional statistical or empirical function may be performed by the central processor 24.

Output from the central processor 24 may be, for example, stored in a database and retrieved for analysis as desired. Output may also be displayed by the central processor 24 by any conventional means and in any conventional way. For example, in an embodiment of the present disclosure, the central processor 24 may produce a histogram or other graphical illustration of the output. Such an illustration may be displayed via, for example, a monitor, printer, or other display device 25. The output may also be uploaded to the Internet via, for example, a modem or other Internet access means 27 known in the art. It is understood that the central processor 24 may further include a keyboard, mouse, and/or other conventional interface devices. It is also understood that output from the central processor 24 may also be transmitted, uploaded, and/or downloaded by any other conventional means not explicitly mentioned herein.

INDUSTRIAL APPLICABILITY

A system 10 of the present disclosure may be used to monitor various operating characteristics of a vehicle 12. The operating characteristics monitored may be indicative of vehicle performance, and the system 10 may facilitate communication of the sensed operating characteristic data between the vehicle 12 and a central processor 24 useful in, for example, manipulating, storing, and/or reporting the data. The processed data may be used by an operator 19 for prognostic or other purposes and may be used to predict, for example, tire and/or vehicle frame life.

The disclosed monitoring system 10 may be used to monitor operating characteristics of a vehicle before, during, and after the performance of an application. As mentioned above, the system 10 may be used with any type of vehicle 12 and/or work machine known in the art. Moreover, the applications capable of being performed by the vehicle may include, but are not limited to, stockpiling, trenching, hammering, digging, raking, grading, moving pallets, material handling, snow removal, tilling soil, demolition work, carrying, cutting, backfilling, sweeping, and on-road or off-road driving. In an embodiment of the present disclosure, vehicle and tire operating characteristics may be sensed, and data collected from the sensing may be used to calculate an expected tire life and/or an expected vehicle frame life. An exemplary method of monitoring vehicle and tire operating characteristics will now be described in detail.

In an exemplary embodiment, the system 10 may be used to monitor vehicle and tire operating characteristics on a mining vehicle 12 such as, for example, a heavy duty truck, skid steer loader, or other conventional vehicle capable of transporting raw materials. It is understood that the system 10 may be used to monitor a fleet of vehicles operating at, for example, a jobsite.

Figure 2:
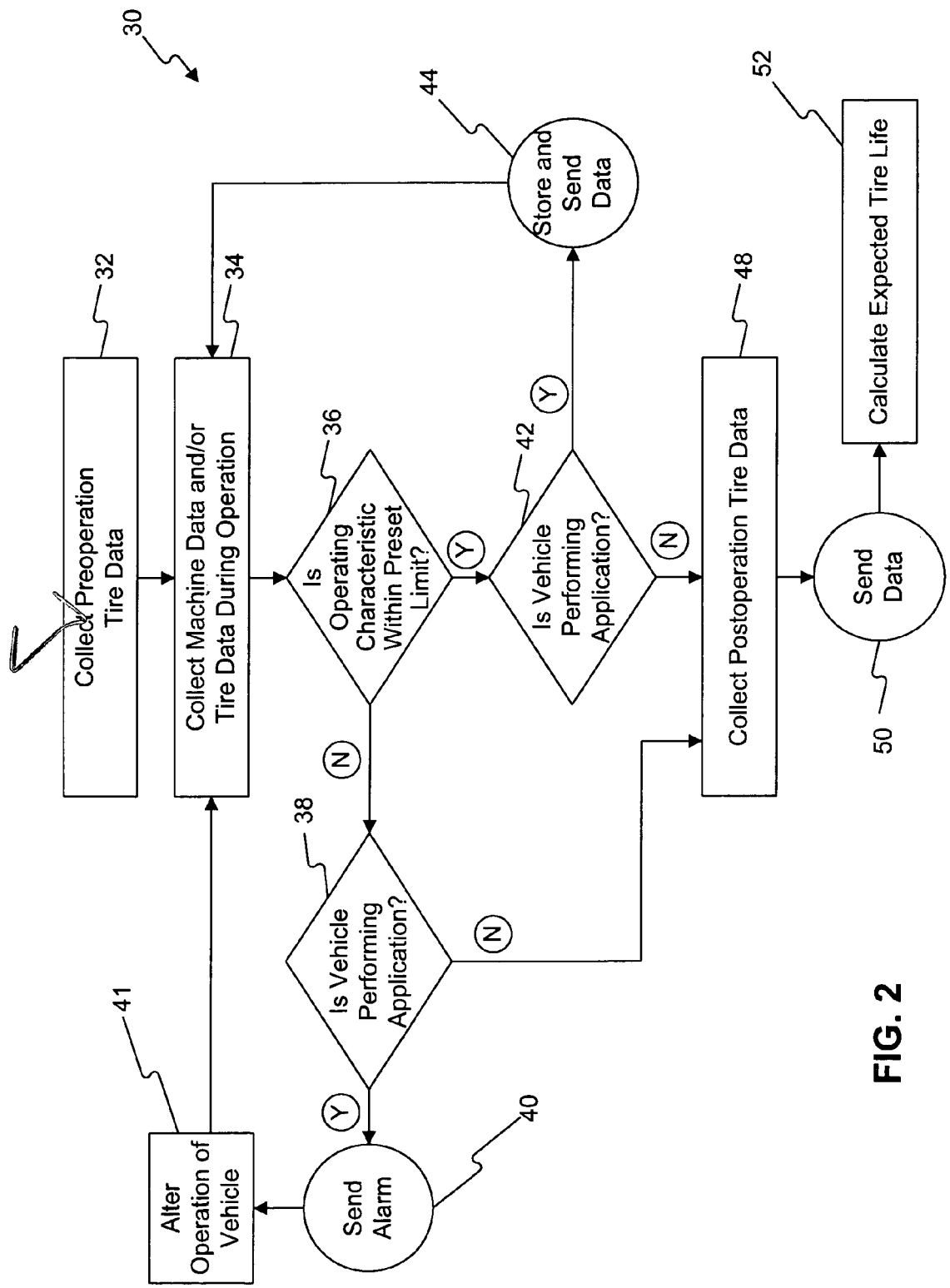
FIG. 2 is a flow chart of a monitoring strategy according to an exemplary embodiment of the present disclosure.

FIG. 2 illustrates a monitoring strategy flow chart 30 according to an exemplary embodiment of the present disclosure. It is understood that each of the system components discussed below is illustrated in FIG. 1, while each of the "steps" discussed below is illustrated in FIG. 2. Accordingly, although not explicitly depicted in FIG. 2, an operator 19 may collect pre-operation tire data from the tire sensors 17 using the recorder 26 (step 32). The data collected may correspond to operating characteristics of the tires 14, such as, for example, tire temperature, tire condition, and/or tire pressure. Tire condition data may include the presence of any catastrophic or near catastrophic cuts visually observable by the operator 19. As used herein, the term "catastrophic" is defined as any visibly observable condition that may render the tire unusable or that may cause fluid to escape from the tire. The operator 19 may collect this tire data by physically and/or visually inspecting each tire 14 during a shift change and/or before the operator 19 begins a desired application. The data may be stored in the recorder 26 and may be transferred to the central processor 24 before a new application is started.

The controller 18 may begin collecting vehicle and/or tire data from the sensors 16, 17 automatically upon vehicle start-up or commencement of the application (step 34). Alternatively, the controller 18 may begin collecting vehicle and/or tire data when the vehicle operator 19 activates an on/off switch or other operator interface 28. Data collection may be at predetermined intervals. For example, the controller 18 may collect data corresponding to vehicle operating characteristics approximately once per second. The operating characteristics sensed may be related to vehicle and/or tire performance.

Upon receipt of the data, the controller 18 may determine whether each operational characteristic sensed is within a corresponding preset limit for that particular operational characteristic (step 36). Such limits may be set by the operator or the manufacturer of the tire 14 or other vehicle component being sensed and may be stored in the memory of the controller 18. The controller 18 may utilize one or more algorithms to assist in processing the data collected and comparing the data to the stored preset limits. For example, the controller 18 may receive signals from the vehicle sensors 16 containing payload weight information and/or other vehicle operating characteristics. Such signals may be coded with manufacturer and vehicle-type information. The controller 18 may also receive signals from the tire sensors 17 containing tire pressure information, tire temperature information, and or other tire operating characteristics. Such signals may be coded with manufacturer and tire-type information. The controller 18 may input the vehicle and tire information into algorithms corresponding to the coded manufacturer and type information to determine whether, for example, the vehicle payload weight, the tire temperature, and/or the tire pressure are outside of the manufacturer specified range for such characteristics.

If any of the sensed operating characteristics are not within the preset limits (step 36: No), the controller 18 may first determine whether the vehicle 12 is still performing a desired application or if the vehicle is shut down (step 38). The controller 18 may determine this by processing any of the information signals it receives. If the vehicle 12 is still performing an application (step 38: Yes), the controller 18 may send an alarm (step 40) to the central processor 24 and/or the operator 19. The alarm may contain the sensed operational characteristic values that are outside of the preset limit. The alarm may also contain information useful in describing the event, such as, for example, date, time, machine, and/or operator identifiers. Alarms sent to the central processor 24 may be stored in, for example, the internal memory of the central processor 24 until processing is required.

Alarms sent to the operator 19 may appear by way of the operator interfaces 28 in the cabin of the vehicle 12. The operator may alter the operation of the vehicle 12 (step 41) in response to such alarms. Although the operator 19 is depicted outside of the cabin of the vehicle 12 in FIG. 1, it is understood that the operator 19 may be within the cabin while altering the operation of the vehicle 12. Such alterations may include, for example, reducing the travel speed of the vehicle 12, reducing the payload of the vehicle 12 by dumping all or part of a load, and/or changing the travel path of the vehicle 12. After the operator 19 makes the desired alterations (step 41), the controller 18 may continue to collect data from the sensors 16, 17 during operation (step 34).

If the controller 18 determines the vehicle 12 is not performing an application (step 38: No), the operator 19 may collect post-operation tire data (step 48) using the recorder 26. Similar to the method described above with respect to step 32, the operator 19 may collect this post-operation tire data by physically and/or visually inspecting each tire 14 during a shift change and/or after the operator 19 completes or stops performing a desired application. The data may be stored in the recorder 26 and may be transferred, uploaded, or otherwise sent to the central processor 24 (step 50) before a new application is started.

The central processor 24 may utilize, for example, the pre-operation tire data, the post-operation tire data, and the vehicle and/or tire operating characteristic data contained in the alarms sent by the controller 18 to calculate an estimated tire life (step 52). It is understood that the central processor 24 may also use any of the other information measured by the sensors 16, 17 in this calculation. As mentioned above, at least some of this data may be stored in the central processor 24 before, during, and/or after the operation of a desired application. The central processor 24 may utilize a number of algorithms to calculate the estimated tire life, and the algorithms may use any of the operating characteristics described above as inputs. It is also understood that in an exemplary embodiment, the expected life of each tire 14 on a particular vehicle 12 may be calculated by the controller 18 located on that vehicle 12. As will be described in greater detail below, the tire life estimates may be useful in, for example, managing a fleet of vehicles 12 and/or managing jobsite resources, such as, for example, inventory, budget constraints, and/or vehicle maintenance schedules.

In an exemplary embodiment, calculating the expected tire life may include deriving a normalized weighted consumption value for each life consumption variable, summing each of the normalized weighted consumption values, and subtracting the sum from the manufacturer specified tire life. As used herein, the term "life consumption variable" is defined as any characteristic or factor that may reduce the useful life of a tire. Such consumptions may include, for example, any of the tire and vehicle operating characteristics discussed above. For example, the sensors 16, 17 may sense vehicle payload, tire temperature, and tire pressure values for a given vehicle 12. Each of the sensed values (life consumption variables) may be normalized according to normalization tables known in the art. Such normalization tables are particular to the operating characteristic sensed. Once the payload, temperature, and pressure values are normalized, each value may be weighted according to its effect on expected tire life. For example, tire temperature may have a different effect on expected tire life than vehicle payload and, thus, may have a different empirical weight assigned to it when calculating the expected tire life. The normalized weighted values may then be summed. It is understood that a tire 14 may have a manufacturer specified tire life representing the maximum expected life of the tire 14 under ideal conditions. The calculated sum may be subtracted from the manufacturer specified tire life to determine the remaining expected tire life.

If the vehicle 12 is operating within its pre-set limits (step 36: Yes), the controller 18 may determine whether the vehicle 12 is still performing an application (step 42). The controller 18 may determine this by processing any of the information signals it receives. If the vehicle 12 is not still performing an application (step 42: No), the operator 19 may collect post-operation tire data (step 48) using the recorder 26 as described above. The data may be stored in the recorder 26 and may be transferred, uploaded, or otherwise sent to the central processor 24 (step 50) before a new application is started. The central processor may utilize the pre-operation tire data, the post-operation tire data, and the vehicle and/or tire operating characteristic data contained in the alarms sent by the controller 18 to calculate an estimated tire life (step 52).

If the controller 18 determines that the vehicle 18 is still performing an application (step 42: Yes), the controller 18 may store the data received from the sensors 16, 17 (step 44) in a conventional internal memory device. The controller 18 may also be programmed to send the data to the central processor 24 automatically. After storing and/or sending the data, the controller 18 may continue to collect data from the sensors 16, 17 during operation (step 34).

Using data corresponding to tire and vehicle operating characteristics to calculate the estimated life of tires 14 on a vehicle 12 at a jobsite may assist in managing the operation of a vehicle 12, a fleet of vehicles 12, and/or an entire jobsite. For example, in addition to altering the operation of the vehicle 12 in response to an alarm sent by the controller 18, it is understood that the operator 19 may also alter the operation of the vehicle 12 in response to the calculated expected tire life. Such alterations may include, for example, modifying the payload weight, changing the speed of the vehicle 12, and/or changing the distance and/or path traveled by the vehicle 12. Such alterations may result in an improvement in the expected tire life and/or the expected life of the vehicle 12. Such alterations may also improve the efficiency of the fleet and/or the jobsite as a whole.

For example, lower than expected tire life calculations may be the result of particularly rough and/or uneven terrain, such as, for example, poor underfoot conditions being traversed by the vehicle 12 during the performance of an application. Recognizing such conditions may enable the operator 19 to alter the travel path of the vehicle 12 to avoid such conditions in future applications, thereby extending tire life. The location of such conditions may be recorded by the operator 19 with recorder 26 manually, or, in an exemplary embodiment, the sensors 16, 17 may sense such location data with the assistance of a global positioning device and/or other location sensing device.

Recognizing such conditions may also assist a jobsite manager in determining, for example, whether to improve travel path conditions in certain areas of the jobsite. It is understood that certain mining and/or heavy duty application tires 14 may cost upwards of $25,000 each. Thus, jobsite improvements such as, for example, altering the slope of a path, and/or improving the surface quality of the path may reduce the overall cost of operating the jobsite by, for example, extending the life of each tire 14 and/or vehicle 12 traversing the improved travel path. Improved conditions may also reduce the amount of fuel used by the vehicle 12 and may increase the speed at which the vehicle 12 is able to safely traverse the path. Such cost reductions and performance improvements may improve the overall efficiency and/or cost effectiveness of the jobsite.

The calculated expected tire life may also assist the jobsite manager in determining how to manage the operators 19 of the vehicles 12 being used. For example, during each shift, a jobsite manager may associate the calculated tire life expectancy for a particular vehicle 12 with the operator 19 using the vehicle 12. Consistently low expected tire life calculations attributed to a particular operator 19 may indicate that the operator 19 may need additional vehicle training, and/or that the operator 19 is not performing an application as instructed. Being able to identify operators 19 in need of training may assist the jobsite manager in improving the performance and/or output of a jobsite such as, for example, a mine, and may result in increased mine efficiency.

Using data corresponding to tire and vehicle operating characteristics to calculate the estimated life of tires 14 on a vehicle 12 at a jobsite may also assist in estimating changes in productivity for a particular jobsite. For example, as described above, data corresponding to tire and vehicle operating conditions may be stored in an internal memory or database of the central processor 24. This stored data may, thus, form a historical tire and vehicle operating characteristic database. Such historical data may be processed using a number of algorithms and/or jobsite management software applications to produce indicators of jobsite performance. Such performance indicators may be charted and/or tracked over time and may include, for example, vehicle maintenance schedules, jobsite inventories, jobsite operating budgets, operator work schedules, jobsite production timelines, and monthly resource outputs.

It is understood that the overall productivity and/or efficiency of a jobsite may depend upon the tire and vehicle operating characteristics of each of the vehicles 12 in use at the jobsite. For example, in an embodiment of the present disclosure, a jobsite may utilize a number of vehicles 12 working in conjunction to perform a desired application. If a vehicle or tire operating characteristic of one of the vehicles 12 falls outside of a preset limit for that particular operating characteristic, the central processor 24 may calculate an estimated jobsite productivity value. The central processor 24 may utilize a number of algorithms to calculate the estimated jobsite productivity value, and the algorithms may use any of the operating characteristics described above as inputs. For example, the estimated jobsite productivity value may correspond to the sensed operating characteristics of each of the vehicles 12 performing the application, and may be provided to, for example, an operator 19 and/or a jobsite manager using any of the display devices 25 discussed above. The estimated jobsite productivity value may be a conventional jobsite productivity metric, and more than one such metrics may be applicable to a particular jobsite. For example, in a coal mine in which multiple vehicles 12 are used to extract coal from the earth, conventional jobsite productivity metrics may include tons of coal extracted per man hour, vehicle fleet fuel consumption per man hour, and/or the average vehicle downtime of the fleet of vehicles 12 per man hour. It is understood that the metrics used may vary based on the type of jobsite and/or the application being performed.

The central processor 24 may compare the estimated jobsite productivity value to a preset minimum jobsite productivity value corresponding to the particular application being performed. If the estimated value is below the preset minimum value for the application, the central processor 24 may identify the vehicle 12 and or vehicles 12 having deficient operating characteristic values and generate a performance modification command. The performance modification command may be, for example, an alarm sent to the operator 10 of the vehicle 12 or vehicles 12 by way of the operator interfaces 28 in the cabin of the vehicle 12. For example, as described above with respect to a coal mine jobsite, the central processor 24 may calculate the expected tons of coal extracted per man hour for a fleet of vehicles 12 and may compare this value with a desired extraction rate for the mine. If the expected value is less than the desired extraction rate, the central processor 24 may identify one or more vehicles 12 in the fleet having operating characteristics outside of preset limits and may generate a corresponding alarm.

The operator 19 may alter the operation of the vehicle 12 in response to the alarm. Such alterations may include, for example, reducing the travel speed of the vehicle 12, reducing the payload of the vehicle 12 by dumping all or part of a load, using the vehicle 12 to perform a different application, and/or changing the travel path of the vehicle 12. It is understood that if the vehicle 12 is used to perform a different application, the vehicle 12 may be replaced by a different vehicle 12 capable of performing the desired application. The alarms corresponding to the performance modification command may also be stored in an internal memory of the central processor 24 and/or provided to an operator 19 and/or a jobsite manager via one or more of the display devices 25. The alarms may also be used by the operator 19 and/or jobsite manager to assist in improving the performance, operation, and/or output of the jobsite. Thus, the operation of the jobsite may be altered in response to the alarm. It is understood that, in an exemplary embodiment of the present disclosure, a method of managing a jobsite may include sensing a vehicle operating characteristic of at least one of a plurality of vehicles 12, and providing an output indicative of an estimated jobsite productivity based on the vehicle operating characteristic. Such an exemplary embodiment, may not include sensing a tire operating characteristic of the at least one vehicle 12.

In additional embodiment of the present disclosure, a calculated expected tire life may be compared to, for example, actual tire life, actual vehicle life, and/or other data stored in the database of the central processor 24. Such comparisons may assist in estimating, for example, projected productivity changes in like jobsites. Such comparisons and/or estimates may be adjusted based on, for example, differing jobsite types, differing vehicle travel path conditions, and/or differing vehicle 12 and/or tire 14 types.

It is also understood that forming such a historical database may assist the jobsite manager in tracking the life of each tire 14 in a fleet of machines 12. Such historical tire data may be useful in determining, for example, which tires 14 are most cost effective for a particular application, and/or for a particular work environment. Such determinations may assist in managing the vehicles 12 in a fleet and/or the jobsite as a whole.

It is further understood that the expected tire life calculated by an embodiment of the present disclosure may correspond to an expected vehicle life. For example, the presence of multiple cuts on a relatively new tire may be an indication that the tire 14 has been subjected to rough driving conditions. While having adverse effects on the expected tire life, such conditions may also have an adverse effect on vehicle life and, more particularly, vehicle frame life. It is understood that in addition to rugged terrain, rough driving conditions may also include conditions resulting from the control of the vehicle 12 by the operator 19. For example, sudden starts, stops, and/or sharp cornering of the vehicle 12 at elevated speeds may detrimentally effect tire life and vehicle frame life.

In an exemplary embodiment of the present disclosure, an expected vehicle life may be calculated using a number of algorithms. The inputs used in the expected vehicle life algorithms may be the same as the inputs used in the expected tire life algorithms described above. Thus, the calculated expected vehicle life may correspond to, and may be based on, the calculated expected tire life. It is understood, however, that each life consumption variable may affect the expected vehicle life differently than the expected tire life. For example, a cut in the sidewall of a tire 14 may have a significant impact on the expected life of the tire 14 and may be heavily weighted in an expected tire life algorithm. The same cut may have little effect on the expected life of the vehicle 12, however, and may not be as heavily weighted in an expected vehicle life algorithm. It is understood that a vehicle 12 may use multiple generations of tires 14 during the course of the vehicle's useful life. It is further understood that the expected tire life of each tire 14 in each generation may be tracked in calculating the expected life of the vehicle 12.

In an exemplary embodiment, calculating the expected vehicle life may include deriving a normalized weighted consumption value for each life consumption variable, summing each of the normalized weighted consumption values, and subtracting the sum from the manufacturer specified vehicle life. Similar to the expected tire life calculation described above, in calculating the expected vehicle life, and, more particularly, the expected frame life, the sensors 16, 17 may sense, for example, vehicle payload, tire temperature, and tire pressure values for a given vehicle 12. Each of these life consumption variables may be normalized according to normalization tables known in the art. Such normalization tables are particular to the operating characteristic sensed. Once the payload, temperature, and pressure values are normalized, each value may be weighted according to its effect on expected vehicle life. The normalized weighted values may then be summed. It is understood that, similar to a tire 14, a vehicle 12 may have a manufacturer specified frame life representing the maximum expected life of the vehicle frame under ideal conditions. The calculated sum may be subtracted from the manufacturer specified frame life to determine the remaining expected frame life.

Other embodiments of the disclosure will be apparent to those skilled in the art from consideration of the specification and practice of the present disclosure. For example, electric current, voltage, and/or resistance sensors may be used to collect data. The current, voltage, or resistance data may assist in monitoring the operating characteristics of the vehicle 12. In addition, calculated expected tire life may be based, in part, on image analysis of cuts in the tires 14. For example, images recording the depth, width, location, and/or other characteristics of tire cuts may recorded and stored by, for example, the recorder 26. Such images may be transferred to the central processor 24 which may use image processing and/or analysis software to determine the severity of the cut and the expected effect on tire life. Moreover, in an embodiment of the present disclosure, the monitoring strategy may be an open-loop strategy.

It is intended that the specification and examples be considered as exemplary only, with the true scope of the disclosure being indicated by the following claims.

What is claimed is:

1. A method of managing a plurality of vehicles comprising:
    sensing a tire operating characteristic of at least one of the plurality of vehicles during an operation;
    sensing a vehicle operating characteristic of the at least one vehicle during the operation;
    providing an output signal indicative of an expected tire life based on the tire operating characteristic and the vehicle operating characteristic of the at least one vehicle; and
    altering operation of the plurality of vehicles in response to the output signal generated based on the at least one but not necessarily all of the plurality of vehicles.

2. The method of claim 1, wherein the tire operating characteristic includes at least one of tire temperature, tire pressure, distance traveled, and tire load.

3. The method of claim 1, wherein the vehicle operating characteristic includes at least one of engine temperature, engine speed, engine torque, vehicle fluid temperature, fluid flow rate, fluid pressure, exhaust flow, exhaust temperature, vehicle run time, distance traveled, gear position, throttle position, ambient air temperature, vehicle speed, brake temperature, brake application, fuel consumption, strut pressure, and payload weight.

4. The method of claim 1, wherein the vehicle operating characteristic is sensed during operation of a desired application.

5. The method of claim 1, wherein the tire operating characteristic is sensed during operation of a desired application.

6. The method of claim 1, further including determining whether at least one of the tire operating characteristic and the vehicle operating characteristic is within a desired range.

7. The method of claim 6, further including determining whether the at least one vehicle is performing a desired application.

8. The method of claim 6, further including sending an alarm containing information corresponding to at least one of the tire operating characteristic and the vehicle operating characteristic.

9. The method of claim 6, further including altering the operation of the plurality of vehicles in response to at least one of the tire operating characteristic and the vehicle operating characteristic.

10. The method of claim 6, wherein an operator alters an aspect of the operation of the plurality of vehicles in response to at least one of the tire operating characteristic and the vehicle operating characteristic.

11. The method of claim 1, wherein the at least one vehicle includes the plurality of vehicles.

12. The method of claim 1, further including calculating an expected tire life and altering the operation of the plurality of vehicles in response to the expected tire life.

13. The method of claim 12, wherein an operator alters an aspect of the operation of the plurality of vehicles in response to at least one of the tire operating characteristic and the vehicle operating characteristic.

14. The method of claim 1, further including providing an output signal indicative of an expected vehicle life based on the expected tire life output signal.

15. The method of claim 1, wherein the output signal indicative of expected tire life is a calculated value that is calculated remotely.

16. The method of claim 1, further including collecting pre-operation tire data corresponding to at least one tire operating characteristic.

17. The method of claim 16, further including providing a recorder configured to store the pre-operation tire data.

18. The method of claim 16, wherein the pre-operation tire data corresponds to at least one of tire pressure, tire temperature, and tire condition.

19. The method of claim 16, wherein providing an output signal indicative of expected tire life further includes basing the output signal on the pre-operation tire data.

20. The method of claim 1, further including providing a receiver configured to receive and transmit data corresponding to at least one of the tire operating characteristic and the vehicle operating characteristic.

21. A method of managing a plurality of vehicles, comprising:
sensing at least one tire operating characteristic and at least one vehicle operating characteristic of at least one of the plurality of vehicles;
providing an output signal indicative of an expected tire life based on the at least one sensed tire operating characteristic and the at least one sensed vehicle operating characteristic of the at least one vehicle;
providing an output signal indicative of a travel path condition of a jobsite where the plurality of vehicles operate based on the expected tire life output signal; and
altering the operation of the plurality of vehicles in response to the expected tire life and the travel path condition output signals generated based on at least one but not necessarily all of the plurality of vehicles.

22. The method of claim 21, further including altering the travel path condition in response to the expected tire life output signal.

23. The method of claim 22, wherein the travel path condition includes at least one of vehicle travel path slope and vehicle travel path surface quality.

24. The method of claim 21, further including storing information particular to each of the plurality of vehicles, the information corresponding to at least one of the expected tire life, the tire operating characteristic and the vehicle operating characteristic.

25. The method of claim 21, further including calculating an expected change in jobsite productivity based on the expected tire life output signal.

26. The method of claim 21, further including identifying a responsible operator associated with the expected tire life output signal.

27. The method of claim 21, wherein altering the operation of the plurality of vehicles includes at least one of modifying a payload weight, changing a vehicle speed, modifying a distance traveled, and modifying a path traveled.

28. The method of claim 21, wherein the output signal indicative of expected tire life is calculated remotely.

29. The method of claim 21, further including collecting pre-operation tire data corresponding to at least one tire operating characteristic.

30. The method of claim 29, further including providing a recorder configured to store the pre-operation tire data.

31. The method of claim 29, wherein the pre-operation tire data corresponds to at least one of tire pressure, tire temperature, and tire condition.

32. The method of claim 21, further including providing a receiver configured to receive and transmit data corresponding to at least one of the tire operating characteristic and the vehicle operating characteristic.

33. A system for monitoring vehicle conditions of a plurality of vehicles comprising:
a vehicle sensor configured to sense at least one vehicle operating characteristic of at least one of the plurality of vehicles;
a tire sensor configured to sense at least one tire operating characteristic of the at least one vehicle;
a controller in communication with each of the tire and vehicle sensors of the at least one vehicle; and
a central processor in communication with the controller and configured to provide an output signal indicative of an expected tire life of the at least one vehicle based on the at least one vehicle operating characteristic and the at least one tire operating characteristic, and to alter operation of the plurality of vehicles in response to the expected tire life output signal of the at least one but not necessarily all of the plurality of vehicle.

34. The system of claim 33, further including a recorder in communication with the at least one tire sensor and configured to transmit data to the central processor.

35. The system of claim 33, further including a receiver in communication with the controller and configured to transmit data to the central processor.

36. The system of claim 33, wherein the controller is an electronic control module.

37. The system of claim 33, wherein the at least one tire operating characteristic includes one of tire temperature, tire pressure, distance traveled, and tire load.

38. The system of claim 33, wherein the at least one vehicle operating characteristic includes one of engine temperature, engine speed, engine torque, vehicle fluid temperature, fluid flow rate, fluid pressure, exhaust flow, exhaust temperature, vehicle run time, distance traveled, gear position, throttle position, ambient air temperature, vehicle speed, brake temperature, brake application, fuel consumption, strut pressure, and payload weight.

39. The system of claim 33, wherein the central processor is disposed in a remote location relative to the vehicle.

40. The system of claim 33, wherein the at least one vehicle includes the plurality of vehicles.

41. A method of managing a jobsite, comprising:
receiving information corresponding to an expected tire life of at least one of a plurality of vehicles operating at the jobsite based on a sensed tire operating characteristic and a sensed vehicle operating characteristic of the at least one vehicle;
altering a jobsite performance indicator in response to the information corresponding to the expected tire life of the at least one vehicle; and
altering operation of the plurality of vehicles in response to the altered jobsite performance indicator based on at least one but not necessarily all of the plurality of vehicles.

42. The method of claim 41, wherein the jobsite performance indicator includes at least one of vehicle maintenance schedule, jobsite inventory, jobsite operating budget, operator work schedule, jobsite production timeline, and resource output.

43. The method of claim 41, further including altering a jobsite condition in response to the expected tire life.

44. The method of claim 43, wherein the jobsite condition includes at least one of vehicle travel path slope and vehicle travel path surface quality.

45. The method of claim 41, further including storing information particular to each of the plurality of vehicles, the information corresponding to at least one of the expected tire life, the tire operating characteristic, and the vehicle operating characteristic.

46. The method of claim 41, further including calculating an expected change in jobsite productivity based on the expected tire life.

47. The method of claim 41, further including identifying a responsible operator associated with the expected tire life.

48. The method of claim 41, wherein the expected tire life is calculated in a remote location relative to the at least one of a plurality of vehicles.

49. A method of managing a jobsite, comprising:
sensing a tire operating characteristic of at least one of a plurality of vehicles operating at the jobsite;
sensing a vehicle operating characteristic of the at least one vehicle;
providing an output signal indicative of a travel path condition of the jobsite based on the tire operating characteristic and the vehicle operating characteristic of the at least one vehicle; and
altering the operation of the plurality of vehicles in response to the output signal generated based on at least one but not necessarily all of the plurality of vehicles.

50. The method of claim 49, wherein the travel path condition of the jobsite includes at least one of vehicle travel path slope and vehicle travel path surface quality.

51. The method of claim 49, further including calculating an expected change in jobsite productivity based on the output signal.

52. A method of managing a jobsite, comprising:
sensing a tire operating characteristic of at least one of a plurality of vehicles operating at the jobsite;
sensing a vehicle operating characteristic of the at least one vehicle;
providing an output signal indicative of an estimated jobsite productivity based on the tire operating characteristic and the vehicle operating characteristic of the at least one vehicle; and
altering operation of the plurality of vehicles in response to the output signal generated based on at least one but not necessarily all of the plurality of vehicles.

53. The method of claim 52, further including generating a performance modification command based on an actual estimated jobsite productivity value.

54. The method of claim 53, wherein the generating a performance modification command is in response to a comparison between the actual estimated jobsite productivity value and a desired jobsite productivity value.

55. The method of claim 53, further including altering the operation of the plurality of vehicles in response to the performance modification command.

56. The method of claim 55, wherein the altering the operation of the plurality of vehicles includes at least one of modifying a payload weight, changing a vehicle speed, modifying a distance traveled, changing an application performed, and modifying a path traveled.

57. The method of claim 53, further including altering the operation of the jobsite in response to the performance modification command.

* * * * *

UNITED STATES PATENT AND TRADEMARK OFFICE
CERTIFICATE OF CORRECTION

| | |
|---|---|
| PATENT NO. | : 7,301,445 B2 |
| APPLICATION NO. | : 11/022685 |
| DATED | : November 27, 2007 |
| INVENTOR(S) | : Moughler |

It is certified that error appears in the above-identified patent and that said Letters Patent is hereby corrected as shown below:

In Column 14, Line 58, in Claim 33, after "signal of" delete "the".

In Column 14, Line 59, in Claim 33, delete "vehicle" and insert -- vehicles --, therefor.

Signed and Sealed this

Twenty-second Day of July, 2008

JON W. DUDAS
*Director of the United States Patent and Trademark Office*